(12) United States Patent
Ohishi

(10) Patent No.: US 9,049,280 B2
(45) Date of Patent: Jun. 2, 2015

(54) DISPLAY UNIT AND ELECTRONIC APPARATUS INCLUDING DISPLAY UNIT

(75) Inventor: Shintaro Ohishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 274 days.

(21) Appl. No.: 13/562,676

(22) Filed: Jul. 31, 2012

(65) Prior Publication Data

US 2013/0082580 A1    Apr. 4, 2013

(30) Foreign Application Priority Data

Sep. 30, 2011   (JP) ................................. 2011-218065

(51) Int. Cl.
| G06F 1/16 | (2006.01) |
|---|---|
| H05K 5/00 | (2006.01) |
| H05K 7/00 | (2006.01) |
| H04M 1/02 | (2006.01) |

(52) U.S. Cl.
CPC .......... *H04M 1/0266* (2013.01); *G06F 1/1637* (2013.01)

(58) Field of Classification Search
CPC ... G06F 1/1616; G06F 1/1637; H04M 1/0266
USPC ............. 361/679.21, 679.27–679.29, 679.06, 361/679.04; 312/223.2
See application file for complete search history.

(56) References Cited

U.S. PATENT DOCUMENTS

| 6,389,643 | B1 * | 5/2002 | Lim et al. .......................... 16/271 |
|---|---|---|---|
| 6,542,206 | B1 | 4/2003 | Saito |
| 6,654,078 | B1 * | 11/2003 | Kato et al. ....................... 349/58 |
| 6,957,085 | B2 | 10/2005 | Shin et al. |
| 7,072,690 | B2 | 7/2006 | Shin et al. |
| 7,254,013 | B2 * | 8/2007 | Tatsukami et al. ........ 361/679.27 |
| 7,606,023 | B2 * | 10/2009 | Konno et al. ............. 361/679.26 |
| 7,956,813 | B2 * | 6/2011 | Arima et al. .................... 343/702 |
| 8,147,263 | B2 | 4/2012 | Matsushima et al. |
| 8,228,246 | B2 * | 7/2012 | Arima et al. .................... 343/702 |
| 2002/0151328 | A1 | 10/2002 | Shin et al. |
| 2003/0016489 | A1 | 1/2003 | Agata et al. |
| 2003/0124985 | A1 | 7/2003 | Shin et al. |
| 2004/0041961 | A1 | 3/2004 | Lee |

(Continued)

FOREIGN PATENT DOCUMENTS

| JP | 08-179288 A | 7/1996 |
|---|---|---|
| JP | 10-090526 A | 4/1998 |
| JP | 2000-305066 A | 11/2000 |
| JP | 2001-255516 A | 9/2001 |
| JP | 2002-312070 A | 10/2002 |
| JP | 2003-029241 A | 1/2003 |

(Continued)

OTHER PUBLICATIONS

Office Action of Japanese Patent Application No. 2011-218065 dated Mar. 17, 2015 with Partial Translation.

*Primary Examiner* — Adrian S Wilson
*Assistant Examiner* — Abhishek Rathod
(74) *Attorney, Agent, or Firm* — Maschoff Brennan

(57) ABSTRACT

A display unit includes: a display panel; a pair of side frames extending along side surfaces of the display panel respectively; a back cover that is mounted to the side frames and covers a back surface of the display panel; a front cover that is mounted to the pair of side frames, covers a periphery of a front surface of the display panel and holds a outer periphery of the display panel with the back cover; an upper positioning portion that is formed at an upper end of each of the pair of side frames and extends along an upper surface of the display panel; and a lower positioning portion that is formed at a lower end of each of the pair of side frames and extends along a lower surface of the display panel.

19 Claims, 12 Drawing Sheets

(56) References Cited

U.S. PATENT DOCUMENTS

| | | |
|---|---|---|
| 2004/0184224 A1* | 9/2004 | Kumagai et al. ............ 361/681 |
| 2007/0053144 A1* | 3/2007 | Nakatani et al. ............ 361/680 |
| 2008/0259540 A1 | 10/2008 | Takayanagi et al. |
| 2009/0140121 A1* | 6/2009 | Fujikawa .................... 248/544 |
| 2009/0244835 A1 | 10/2009 | Matsushima et al. |
| 2011/0155448 A1 | 6/2011 | Saito et al. |

FOREIGN PATENT DOCUMENTS

| | | |
|---|---|---|
| JP | 2004-094256 A | 3/2004 |
| JP | 2007-065874 A | 3/2007 |
| JP | 2008-269433 A | 11/2008 |
| JP | 2009-111699 A | 5/2009 |
| JP | 2009-246248 A | 10/2009 |
| JP | 2011-138819 A | 7/2011 |

* cited by examiner

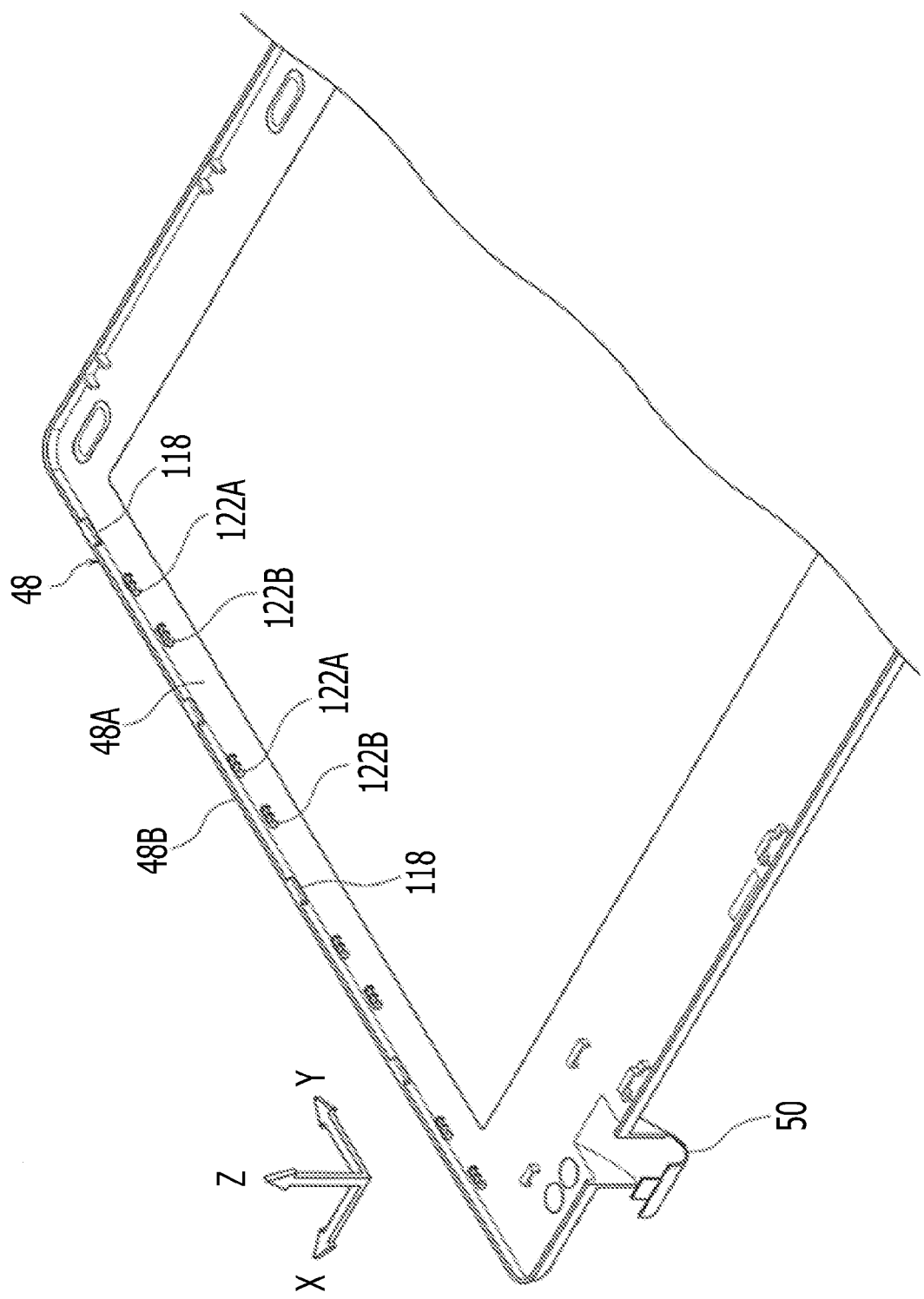

DISPLAY UNIT AND ELECTRONIC APPARATUS INCLUDING DISPLAY UNIT

CROSS-REFERENCE TO RELATED APPLICATION(S)

This application is based upon and claims the benefit of priority of the prior Japanese Patent Application No. 2011-218065, filed on Sep. 30, 2011, the entire contents of which are incorporated herein by reference.

FIELD

The embodiment discussed herein is related to a display unit and an electronic apparatus including the display unit.

BACKGROUND

Notebook-type personal computers (hereinafter referred to as "notebook computers") include a main body unit having a keyboard and so on and a display unit that has a display panel, such as a liquid crystal display, and that is openably supported by the main body unit.

Related art is disclosed in Japanese Laid-open Patent Publication Nos. 2002-312070, 10-90526, 2009-246248, and 2009-111699.

SUMMARY

According to one aspect of the embodiments, a display unit includes: a display panel; a pair of side frames extending along side surfaces of the display panel respectively; a back cover that is mounted to the side frames and covers a back surface of the display panel; a front cover that is mounted to the pair of side frames, covers a periphery of a front surface of the display panel and holds a outer periphery of the display panel with the back cover; an upper positioning portion that is formed at an upper end of each of the pair of side frames and extends along an upper surface of the display panel; and a lower positioning portion that is formed at a lower end of each of the pair of side frames and extends along a lower surface of the display panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an exemplary perspective view of a front cover.

DESCRIPTION OF EMBODIMENT

A display panel is fixed to, for example, a back cover that covers the back surface of a display panel via a sheet metal bracket. The bracket may have an L-shaped cross-sectional retaining portion for holding a cable.

A C-shaped cross-sectional cable cover and a C-shaped cross-sectional cable guide protect and guide cables on a circuit board, respectively. An antenna cover that accommodates an antenna fixed to an end of a flexible board reduces bending deformation of the flexible board of a mobile phone.

The back cover may be formed of a metal plate pressed into a platy shape (hereinafter referred to as "pressed plate") to decrease the thickness of the display unit.

However, this may cause an insufficient strength of the back cover, thus increasing the bending deformation or the like of the display panel due to a display unit opening and closing operation.

If the back cover is formed of a pressed plate, it may be difficult to form a back cover for a rib or the like for positioning the display panel.

Figure 1:
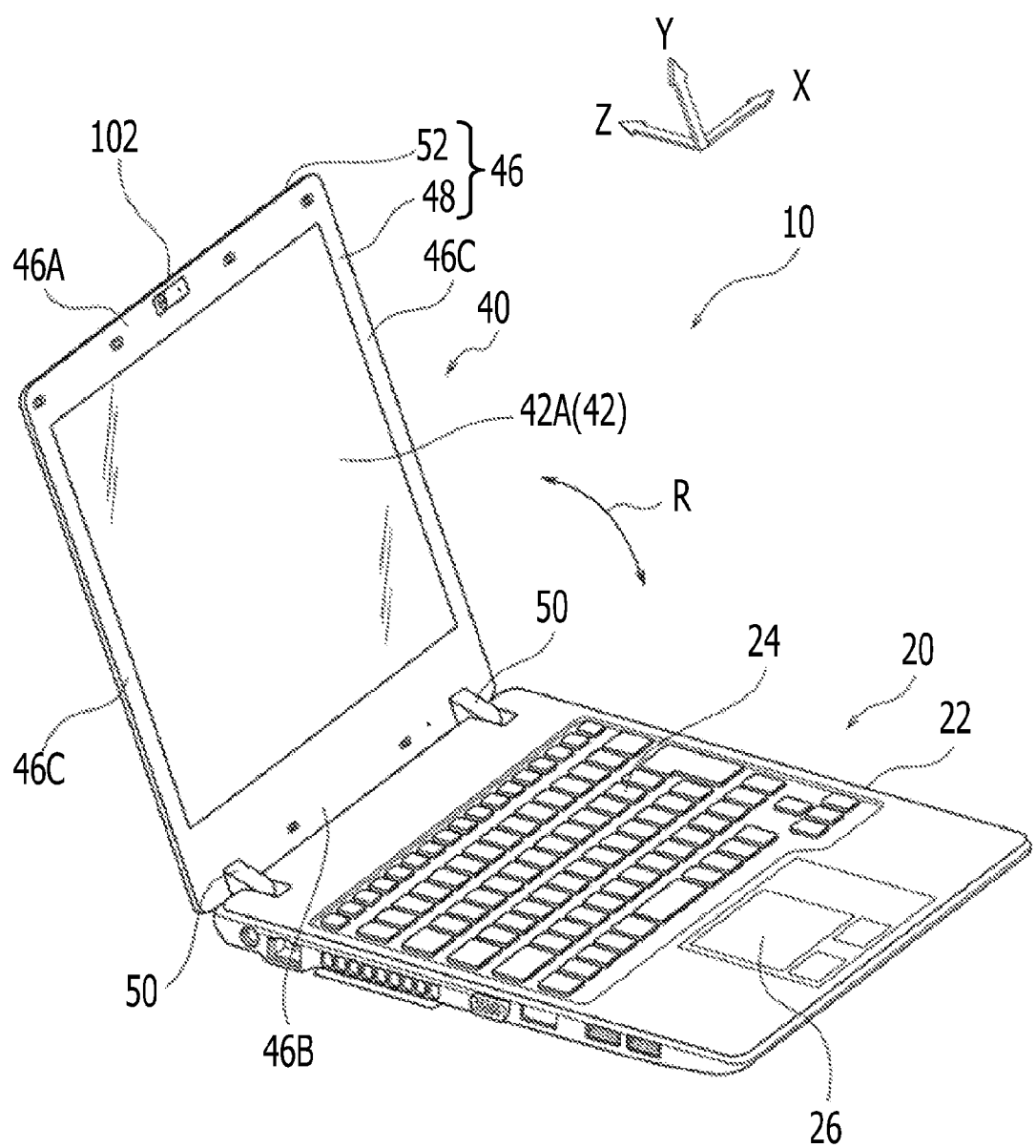
FIG. 1 illustrates an exemplary perspective view of an electronic apparatus.

FIG. 1 illustrates an exemplary perspective view of an electronic apparatus. The electronic apparatus illustrated as FIG. 1 may be a notebook computer 10. The notebook computer 10 illustrated in FIG. 1 includes a main body unit 20 and a display unit 40 supported at the rear end of the main body unit 20 with hinge units illustrated in FIG. 5 so as to be rotatable (openable and closable) in the direction of arrow R. The display unit 40 is formed so as to change in position between a closed position at which it is overlaid on the main body unit 20 and an open position at which it is erected from the main body unit 20.

FIG. 1 illustrates the display unit 40 at the open position. With the display unit 40 at the open position, the direction of arrow X in FIG. 1 may be referred to as the outside (right) of the display unit 40 in the widthwise direction. With the display unit 40 at the open position, the direction of arrow Y may be referred to as the above of the display unit 40 in the vertical direction. With the display unit 40 at the open position, the direction of arrow Z may be referred to as the rear of the display unit 40 in the front-to-back direction. The direction of arrow Z also indicates the rear of the main body unit 20 in the front-to-back direction.

The main body unit 20 includes a box-shaped casing 22. The casing 22 may accommodate a circuit board (main board) on which electronic components (not illustrated), such as a central processing unit (CPU), are mounted. The casing 22 may have an input device, such as a keyboard 24, or a pointing device, such as a touch pad 26, on the upper surface thereof.

Figure 2:
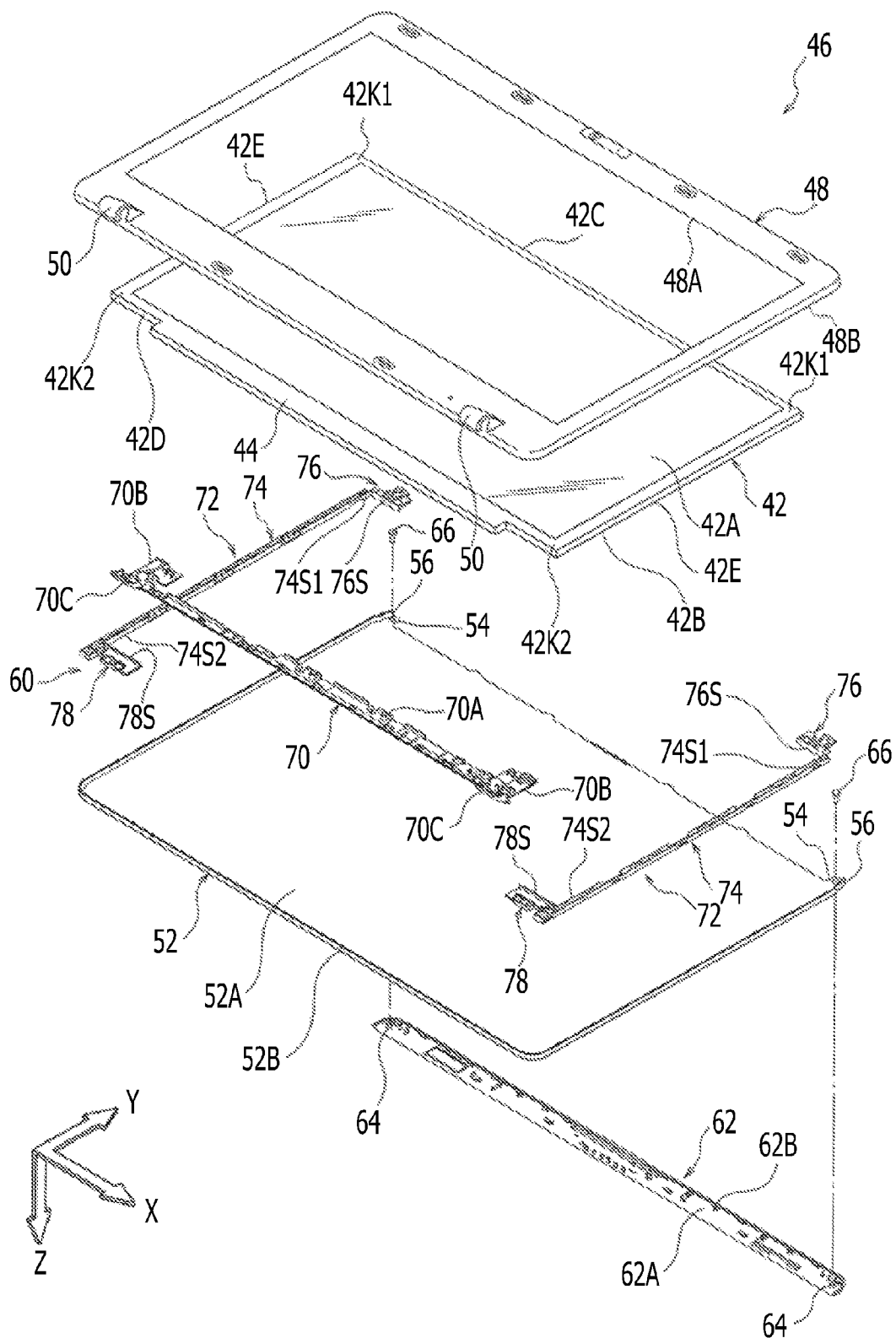
FIG. 2 illustrates an exemplary exploded perspective view of a display unit.

The display unit 40 includes a display panel 42 and a casing 46 that accommodates the display panel 42. FIG. 2 illustrates an exemplary exploded perspective view of a display unit. The display unit illustrated in FIG. 2 may be the display unit 40 illustrated in FIG. 1. As illustrated in FIG. 2, the display panel 42 is formed in a rectangular shape as a whole as viewed from the front-to-back direction of the display unit 40 and has four corners 42K. Two corners 42K at the upper part of the display panel 42 may be referred to as upper corners 42K1, and two corners 42K at the lower part of the display panel 42 may be referred to as lower corners 42K2.

The front surface of the display panel 42 may be a display surface 42A that displays images and pictures. A bulging portion 44 that bulges from a lower surface 42D of the display panel 42 toward a lower frame 70, described later, is provided at an intermediate part of the lower part of the display panel 42 in the widthwise direction.

The casing 46 includes a front cover 48 that covers the outer periphery of the display surface 42A of the display panel 42, a back cover 52 that covers a back surface 42B of the display panel 42, and a casing frame 60 that surrounds the outer periphery of the display panel 42.

The front cover 48 is formed of a plastic mold in the shape of a frame and the display surface 42A of the display panel 42 is exposed from inside. The front cover 48 includes a front wall 48A that covers the periphery of the display surface 42A of the display panel 42 and a side wall 48B that is erected from the outer periphery of the front wall 48A toward the back cover 52. The front cover 48 has hinge covers 50 that cover hinge units 90 (see FIG. 5) outside in the thickness direction of the lower end of the front cover 48. The front cover 48 may cover a camera unit 100 and antenna units 106A and 106B (see FIG. 5) from the front.

The back cover 52 is formed of a pressed metal thin plate (for example, formed of a magnesium alloy). The use of the pressed plate as the back cover 52 decreases the size and weight of the display unit 40. A pressed plate having a thickness of less than 3 mm may be used. The back cover 52 includes a back wall 52A that covers the back surface 42B of the display panel 42 and that holds the display panel 42 with the front wall 48A of the front cover 48 and a side wall 52B that is erected from the outer periphery of the back wall 52A toward the front cover 48.

Antenna-cover mounting portions 54, which protrudes upwards (in the direction of arrow Y) in a convex form from the upper ends, is provided at upper ends of the ends of the back cover 52 in the widthwise direction. The back wall 52A of the antenna-cover mounting portions 54 has mounting holes 56 passing through the back wall 52A in the thickness direction, with which an antenna cover 62 is mounted.

The casing frame 60 includes the antenna cover 62 serving as an upper frame corresponding to an upper part 46A of the casing 46 (see FIG. 1), a lower frame 70 corresponding to a lower part 46B of the casing 46, and a pair of side frames 72 corresponding to sides 46C of the casing 46. The antenna cover 62, the lower frame 70, and the side frames 72 may be formed of plastic molds and may be disposed in a frame shape along the outer periphery of the back cover 52.

The antenna cover 62 is disposed, with the widthwise direction of the display unit 40 as the longitudinal direction thereof, along the upper end of the back cover 52. The antenna cover 62 includes a plate-like back wall 62A that covers the camera unit 100 and the antenna units 106A and 106B from the back and a side wall 62B that is erected from the upper end of the back wall 62A toward the front cover 48.

The antenna cover 62 has bosses 64 at the ends in the longitudinal direction thereof. The bosses 64 are erected from the back wall 62A of the antenna cover 62 toward the front cover 48. The bosses 64 are inserted into the mounting holes 56 in the antenna-cover mounting portions 54 of the back cover 52 from the back of the back cover 52. When the bosses 64 are welded in this state, the antenna cover 62 is fixed to the back cover 52. The back wall 62A at the ends of the antenna cover 62 in the longitudinal direction is provided with welding protrusions 68 (see FIG. 3) adjacent to the bosses 64.

Figure 3:
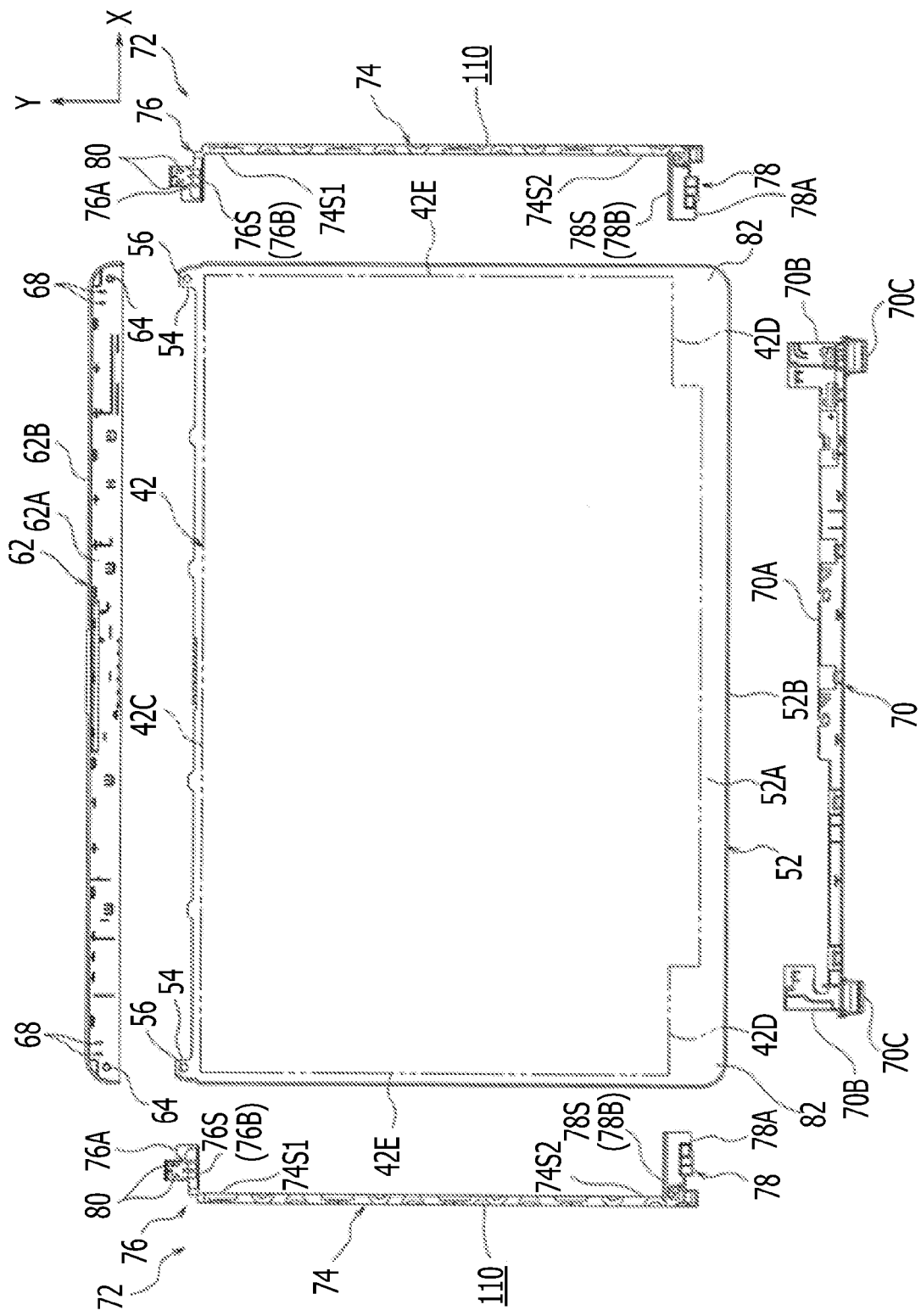
FIG. 3 illustrates an exemplary exploded plan view of a display unit.

FIG. 3 illustrates an exemplary exploded plan view of a display unit. The exploded plan view illustrated in FIG. 3 may be an exploded plan view of the back cover 52 and the casing frame 60 of the display unit 40 illustrated in FIG. 1. As illustrated in FIG. 3, the lower frame 70 is C-shaped as viewed from the front-to-back direction of the display unit 40 and is disposed with the widthwise direction of the display unit 40 as the longitudinal direction. The lower frame 70 includes a plate-like lower-frame main body 70A disposed along the lower end of the back cover 52. The lower-frame main body 70A is bonded to the back wall 52A of the back cover 52 across the entire length in the longitudinal direction with an adhesive, such as an adhesive tape.

The lower-frame main body 70A has, at the ends in the longitudinal direction, plate-like extending portions 70B extending toward the antenna cover 62. The extending portions 70B are bonded to the back wall 52A of the back cover 52 with an adhesive, such as an adhesive tape. The bulging portion 44 of the display panel 42 (see FIG. 2) is disposed between the extending portions 70B. The ends of the lower-frame main body 70A in the longitudinal direction are provided with hinge caps 70C that protrude opposite to the antenna cover 62 (opposite to the extending portions 70B) and that cover hinge shafts 96 of the hinge units 90 (see FIG. 5) from the back.

The pair of side frames 72 are C-shaped as viewed from the front-to-back direction of the display unit 40. The pair of side frames 72 are disposed, with the vertical direction of the display unit 40 as the longitudinal direction, symmetrically about the center of the display unit 40 in the widthwise direction. The side frames 72 each include a side-frame main body 74 extending along a side surface 42E of the display panel 42.

The side-frame main bodies 74 are individually disposed along the ends of the back cover 52 in the widthwise direction and are bonded across the entire length of the back wall 52A of the back cover 52 in the longitudinal direction with an adhesive, such as an adhesive tape. The display panel 42 is disposed between the side-frame main bodies 74.

The side-frame main bodies 74 are formed in an open cross-sectional shape that is open to the front cover 48, illustrated in FIG. 2. The outer side surface of the upper part of each side-frame main body 74 adjacent to the display panel 42 may correspond to a first contact surface 74S1 that comes into surface contact with a side surface 42E1 of the upper corner 42K1 at the upper part of the display panel 42 illustrated in FIG. 5. The outer side surface of the lower part of each side-frame main body 74 adjacent to the display panel 42 may correspond to a first contact surface 74S2 that comes into surface contact with a side surface 42E2 of the lower corner 42K2 at the lower part of the display panel 42 illustrated in FIG. 5. The first contact surfaces 74S1 and 74S2 hold the upper corner 42K1 and the lower corner 42K2 of the display panel 42 therebetween, thus restricting the widthwise displacement of the display panel 42 with respect to the back cover 52.

The side frames 72 each have, at the upper ends, an upper positioning portion 76 extending along the upper surface 42C of the display panel 42. The upper positioning portion 76 extends from the upper end of the side-frame main body 74 toward the center of the display unit 40 in the widthwise direction along the upper surface 42C of the display panel 42. The upper positioning portion 76 includes a plate-like joint portion 76A that is overlaid on the back wall 62A of the antenna cover 62 and a restricting wall 76B that is erected from the end of the joint portion 76A adjacent to the display panel 42 toward the front cover 48.

The joint portion 76A is provided with welding protrusions 80 that are welded with the welding protrusions 68 formed on the antenna cover 62. The welding protrusions 68 and 80 are welded to join the upper positioning portion 76 and the antenna cover 62 together. For example, the antenna cover 62 joins the upper positioning portions 76 of the pair of side frames 72 together.

The restricting wall 76B is disposed along the upper surface 42C of the display panel 42. The side surface adjacent to the display panel 42 may correspond to a second contact surface 76S that comes into surface contact with the upper surface 42C1 of the upper corner 42K1, illustrated in FIG. 5. The second contact surfaces 76S restrict displacement of the display panel 42 toward the antenna cover 62 with respect to the back cover 52. The second contact surface 76S is disposed at right angles to the first contact surface 74S1 of the side-frame main body 74.

The side frames 72 each have, at the lower ends, a lower positioning portion 78 extending along the lower surface 42D of the display panel 42. The lower positioning portion 78 extends from the lower end of the side-frame main body 74 toward the extending portion 70B of the lower frame 70 along the lower surface 42D of the display panel 42. The lower positioning portion 78 includes a plate-like fixed portion 78A to be fixed to the back wall 52A of the back cover 52 with an adhesive, such as an adhesive tape, and a restricting wall 78B that is erected from the end of the fixed portion 78A adjacent to the display panel 42 toward the front cover 48.

Figure 5:
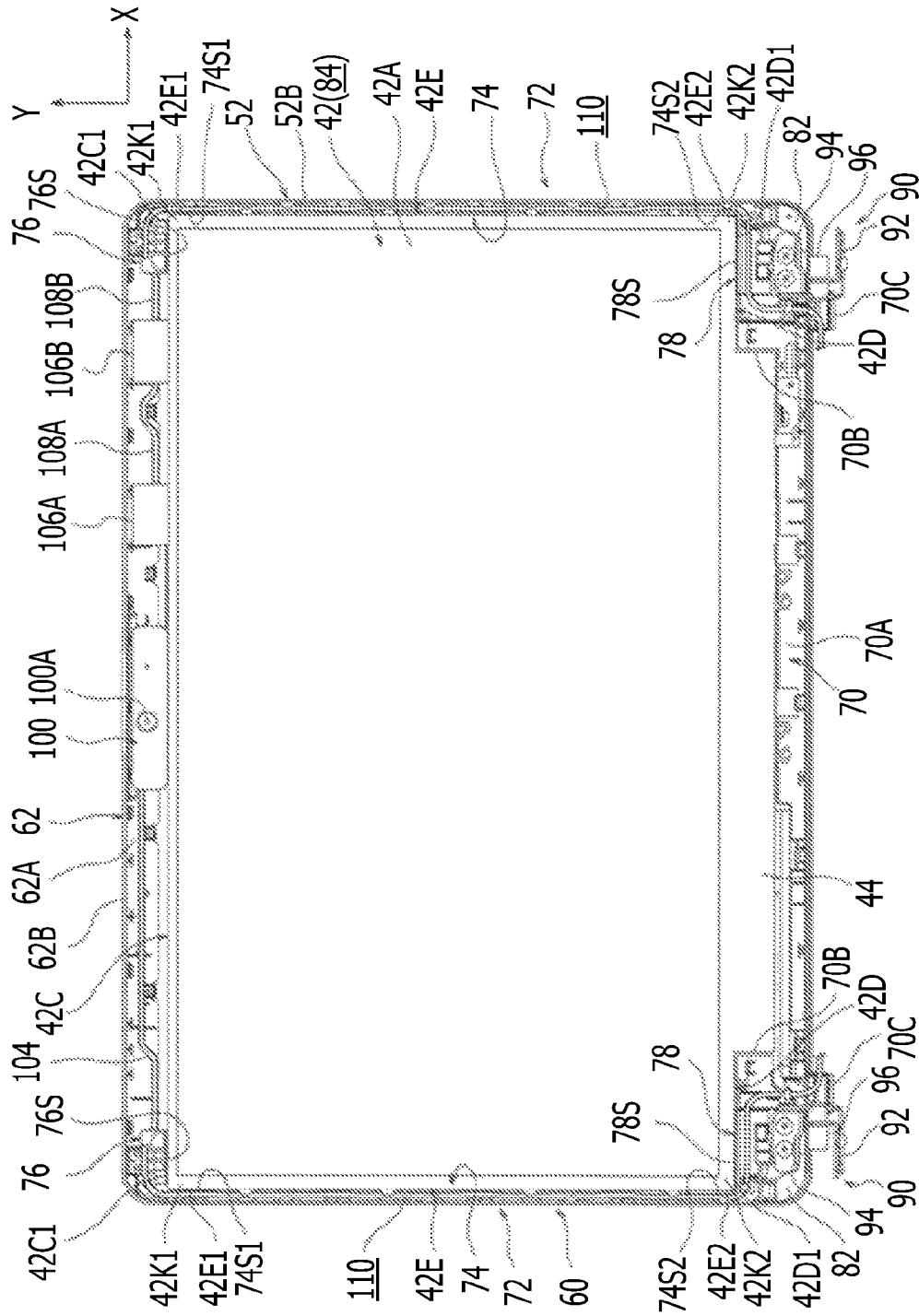
FIG. 5 illustrates an exemplary plan view of a display unit.

The restricting wall 78B is disposed along the lower surface 42D of the display panel 42, and the side surface adjacent to the display panel 42 may correspond to a third contact surface 78S that comes into surface contact with a lower surface 42D1 of the lower corner 42K2, illustrated in FIG. 5. The third contact surfaces 78S restrict the displacement of the display panel 42 toward the antenna cover 62 with respect to the back cover 52. The third contact surface 78S is disposed at right angles to the second contact surface 74S2 of the side-frame main body 74. The part of the back wall 52A of the back cover 52 lower than the lower positioning portion 78 may correspond to a hinge-unit mounting portion 82 to which a bracket 94 of the hinge unit 90, illustrated in FIG. 5, is fixed.

Figure 4:
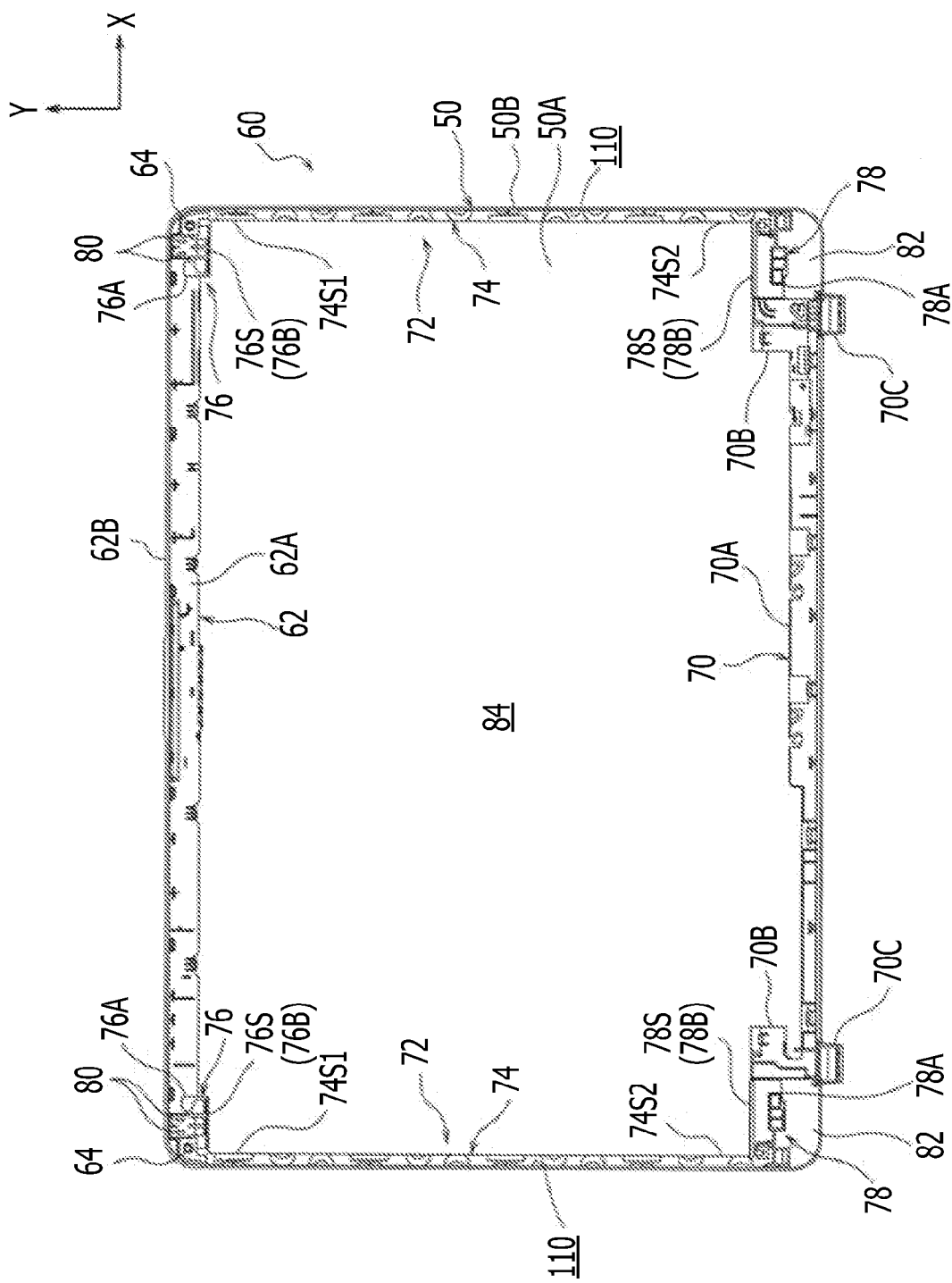
FIG. 4 illustrates an exemplary plan view of a display unit.

FIG. 4 illustrates an exemplary plan view of a display unit. The plan view illustrated in FIG. 4 may be a plan view of the back cover 52 and the casing frame 60 of the display unit 40 illustrated in FIG. 1. As illustrated in FIG. 4, the antenna cover 62, the lower frame 70, and the pair of side frames 72 are disposed along the outer periphery of the back cover 52 to form the frame-shaped casing frame 60. The casing frame 60 has an accommodation space 84 inside thereof in which the display panel 42 illustrated in FIG. 2 is accommodated (fitted).

FIG. 5 illustrates an exemplary plan view of a display unit. The plan view in FIG. 5 may be a plan view of the display unit 40 illustrated in FIG. 1, with the front cover 48 removed. As illustrated in FIG. 5, the pair of side frames 72 determine the position of the display panel 42 accommodated in the accommodation space 84 with respect to the back cover 52. For example, when the display panel 42 is disposed in the accommodation space 84, the first contact surfaces 74S1 and 74S2 come into surface contact with the respective side surfaces 42E1 and 42E2 of the upper corner 42K1 and the lower corner 42K2 of the display panel 42, respectively. Therefore, this restricts the widthwise displacement of the display panel 42 with respect to the back cover 52. The second contact surface 76S of the upper positioning portion 76 comes into surface contact with the upper surface 42C1 of the upper corner 42K1 of the display panel 42. The third contact surface 78S of the lower positioning portion 78 comes into surface contact with the lower surface 42D1 of the lower corner 42K2 of the display panel 42. This allows the vertical displacement of the display panel 42 with respect to the back cover 52 to be restricted.

The hinge units 90 are fixed to the hinge-unit mounting portions 82 of the back cover 52. The hinge units 90 each include a hinge base 92 to be fixed to the casing 22 of the main body unit 20, illustrated in FIG. 1, and the bracket 94 screwed to a sheet metal part that is bonded to the hinge-unit mounting portion 82 with an adhesive, such as an adhesive tape. The hinge unit 90 further includes a hinge shaft 96 that rotatably joins the hinge base 92 and the bracket 94 together.

Figure 6:
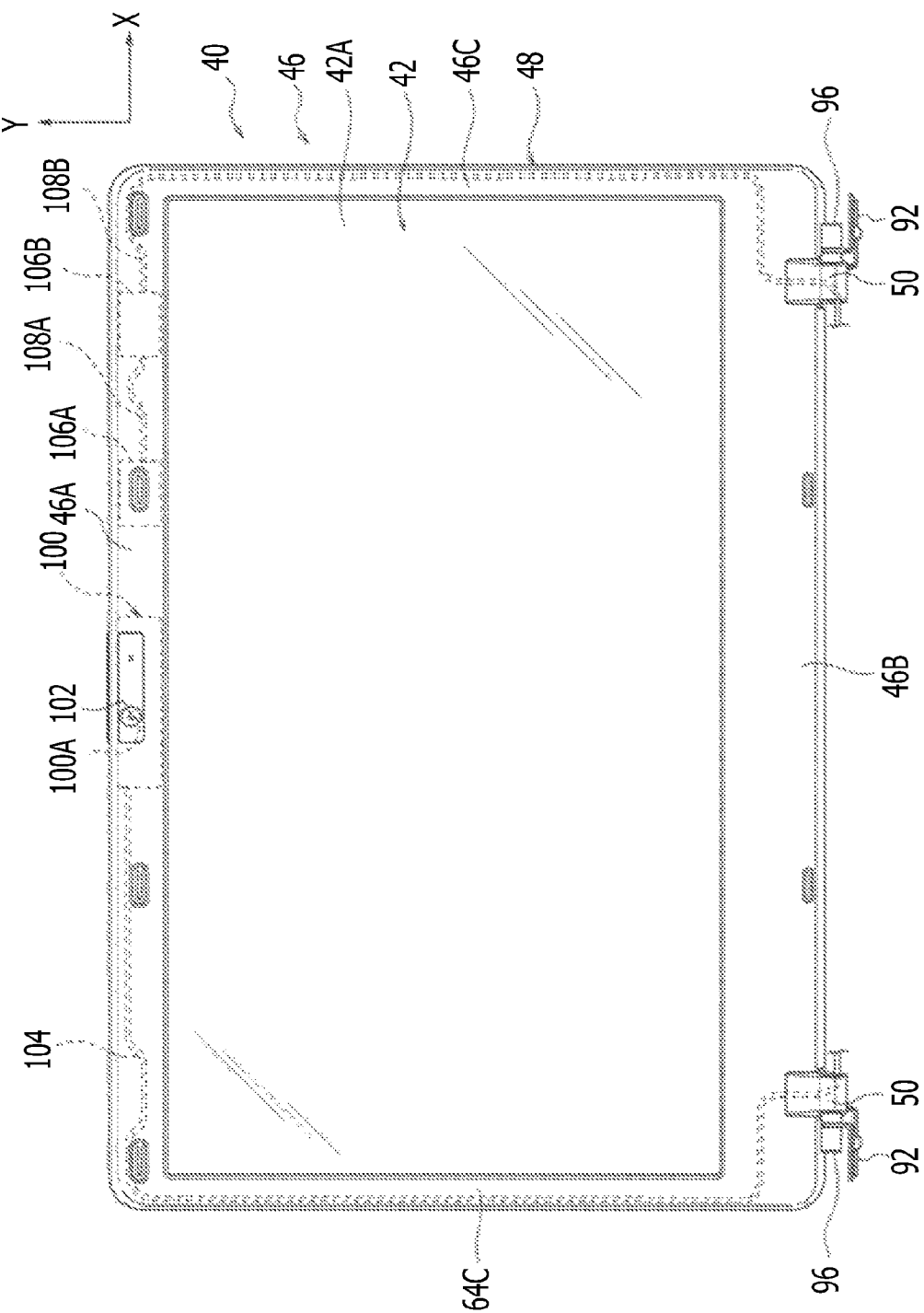
FIG. 6 illustrates an exemplary plan view of a display unit.

The camera unit 100 is accommodated in the center of the antenna cover 62 in the longitudinal direction. The camera unit 100 is disposed along the upper surface 42C of the display panel 42 and is fixed to the back wall 62A of the antenna cover 62. FIG. 6 illustrates an exemplary plan view of a display unit. The plan view of FIG. 6 may be a plan view of the display unit 40 illustrated in FIG. 1. A lens 100A of the camera unit 100 is exposed from a hole 102 in the front cover 48, as illustrated in FIG. 6. An image of an operator in front of the display unit 40 may be acquired by the camera unit 100. The camera unit 100 may be electrically coupled to the circuit board (not illustrated) accommodated in the main body unit 20 illustrated in FIG. 1 with, for example, a camera cable 104.

Figure 7:
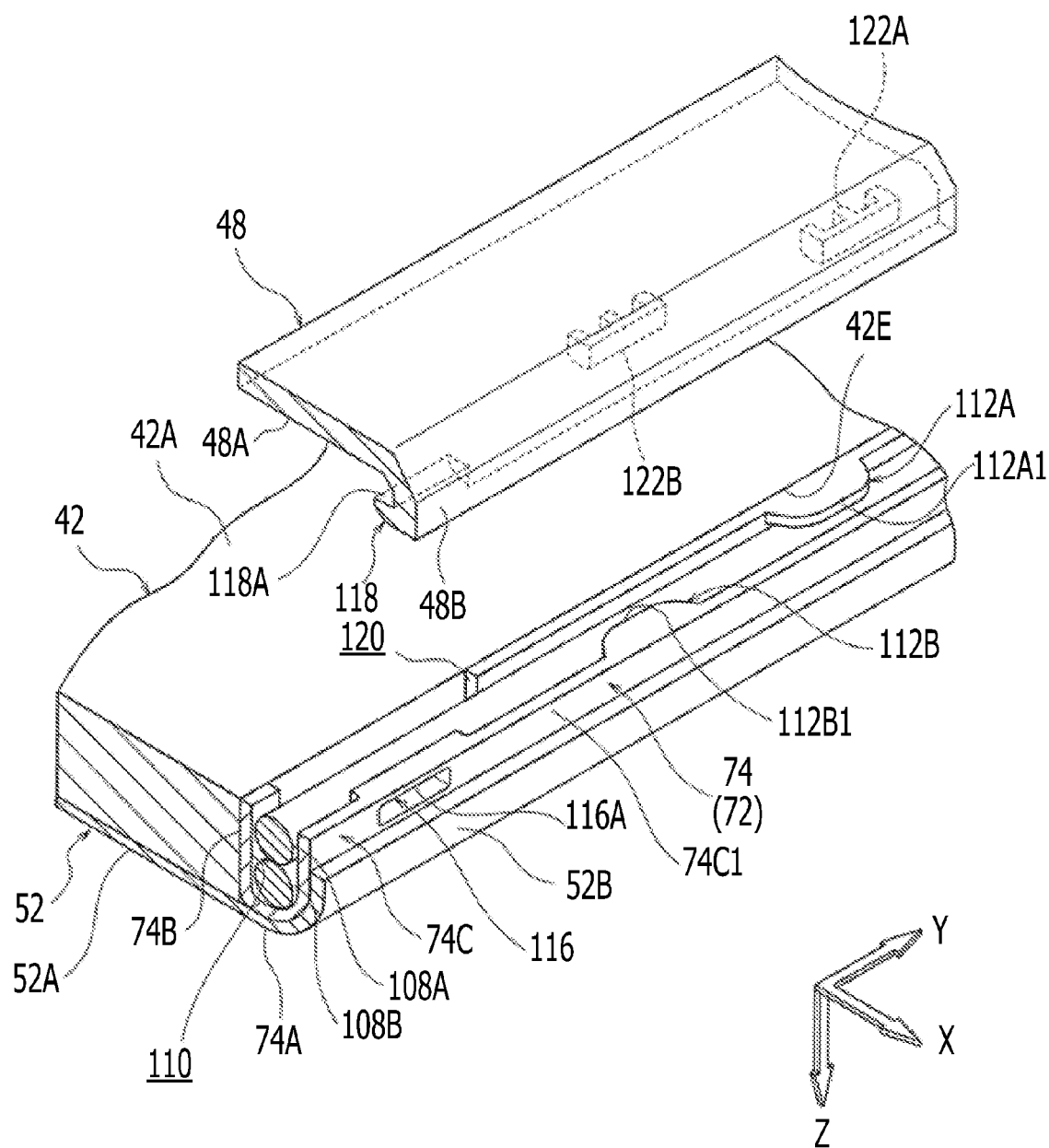
FIG. 7 illustrates an exemplary exploded plan view of a display unit.

As illustrated in FIG. 5, the camera cable 104 is wired from the camera unit 100 counterclockwise along the outer periphery of the display panel 42 and is accommodated in a guide path 110 formed in the side-frame main body 74, illustrated in FIG. 7. The camera cable 104 accommodated in the guide path 110 is wired between the lower surface 42D of the display panel 42 and the bracket 94 of the hinge unit 90. The camera cable 104 wired between the lower surface 42D of the display panel 42 and the bracket 94 of the hinge unit 90 is wired between the bulging portion 44 of the display panel 42 and the bracket 94 of the hinge unit 90. The camera cable 104 that is wired between the bulging portion 44 of the display panel 42 and the bracket 94 of the hinge unit 90 is wired from the hinge cap 70C of the lower frame 70 to the main body unit 20 illustrated in FIG. 1.

The two antenna units 106A and 106B for radio communications are accommodated at the part of the antenna cover 62 outside the camera unit 100 (in the direction of arrow X), in the widthwise direction of the display unit 40. The antenna units 106A and 106B are disposed along the upper surface 42C of the display panel 42 and are fixed to the back wall 62A of the antenna cover 62. The antenna units 106A and 106B couple to, for example, antenna cables 108A and 108B, respectively. The antenna cables 108A and 108B electrically couple the antenna units 106A and 106B to the circuit board (not illustrated) accommodated in the main body unit 20.

The antenna cables 108A and 108B are wired clockwise from the antenna units 106A and 106B along the outer periphery of the display panel 42 and are accommodated in the guide path 110 in the side-frame main body 74, illustrated in FIG. 7. The antenna cables 108A and 108B accommodated in the guide path 110 are wired between the display panel 42 and the hinge unit 90. The antenna cables 108A and 108B wired between the lower surface 42D of the display panel 42 and the bracket 94 of the hinge unit 90 are wired between the bulging portion 44 of the display panel 42 and the bracket 94 of the hinge unit 90. The antenna cables 108A and 108B wired between the bulging portion 44 of the display panel 42 and the bracket 94 of the hinge unit 90 are wired from the hinge cap 70C provided at the lower frame 70 to the main body unit 20 illustrated in FIG. 1.

The camera unit 100 and the antenna units 106A and 106B may be built-in components that are electrically coupled to the circuit board of the main body unit 20 via, for example, the camera cable 104 or the antenna cables 108A and 108B.

Since the pair of side-frame main bodies 74 have substantially the same or similar configuration, only the configuration of the side-frame main body 74 disposed along the right side surface 42E of the display panel 42 will be described.

FIG. 7 illustrates an exemplary exploded perspective view of an electronic apparatus. The exploded perspective view illustrated in FIG. 7 may be an exploded perspective view of the display unit 40 in FIG. 1, with the front cover 48 removed. As illustrated in FIG. 7, the side-frame main body 74 of the side frame 72 has an open cross-sectional shape (C-shaped cross-sectional shape) which is open to the front cover 48 and is disposed along the right side surface 42E of the display panel 42. The side-frame main body 74 includes a bottom wall 74A fixed to the back wall 52A of the back cover 52. The side-frame main body 74 includes a side wall 74B erected from the end of the bottom wall 74A adjacent to the display panel 42 and a side wall 74C erected from the end of the bottom wall 74A opposite to the display panel 42.

The guide path 110 that accommodates the two antenna cables 108A and 108B in the front-to-back direction of the display unit 40 is formed between the opposing pair of side wall 74B and side wall 74C of the side-frame main body 74. The guide path 110 guides the antenna cables 108A and 108B along the side surface 42E of the display panel 42.

Protruding portions 112A and 112B that protrude to the guide path 110 and that reduce dropping-off of the antenna cables 108A and 108B from the guide path 110 are provided at the side walls 74B and 74C of the side-frame main body 74, respectively. The protruding portions 112A protrude from the end of one side wall 74B adjacent to the front cover 48 to the other side wall 74C. The two antenna cables 108A and 108B are accommodated between the protruding portion 112A and the bottom wall 74A of the side-frame main body 74. The protruding portions 112B protrude from the end of the other side wall 74C adjacent to the front cover 48 to the side wall 74B. The two antenna cables 108A and 108B are accommodated between the protruding portions 112B and the bottom wall 74A of the side-frame main body 74.

Figure 8:
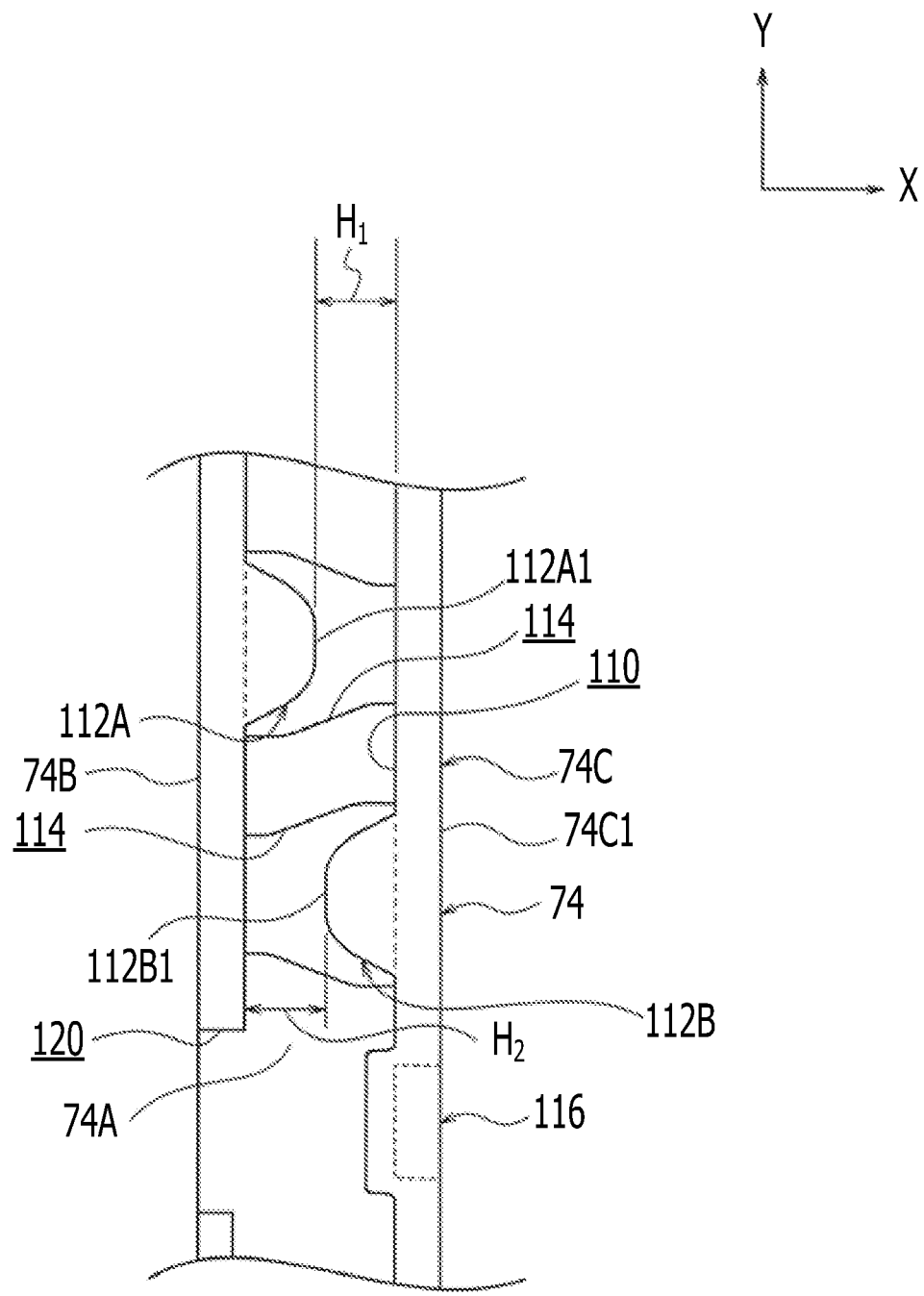
FIG. 8 illustrates an exemplary plan view of a side frame.

FIG. 8 illustrates an exemplary plan view of a side frame. As illustrated in FIG. 8, the protruding portions 112A and 112B are disposed alternately, in a staggered configuration along the length of the side-frame main body 74, and hold the antenna cables 108A and 108B in the guide path 110. A gap $H_1$ is formed between the distal ends 112A1 of the protruding portions 112A and the side wall 74C of the side-frame main body 74. A gap $H_2$ is formed between the distal ends 112B1 of the protruding portions 112B and the side wall 74B of the side-frame main body 74. These gaps $H_1$ and $H_2$ are fitted with ribs 122A and 122B of the front cover 48, respectively. The bottom wall 74A of the side-frame main body 74 may have an opening 114 for reducing the weight thereof.

As illustrated in FIG. 7, grooves 116 are formed in an outer side surface 74C1 of the side wall 74C of the side-frame main body 74 opposite to the display panel 42. The grooves 116 may correspond to long grooves in the side frame 72 extending in the longitudinal direction. The top wall of the grooves 116 may correspond to retained surfaces 116A to which retaining surfaces 118A of claws 118 of the front cover 48 are retained. The part of the side wall 74B of the side-frame main body 74 facing the grooves 116 is provided with openings 120.

Figure 9:
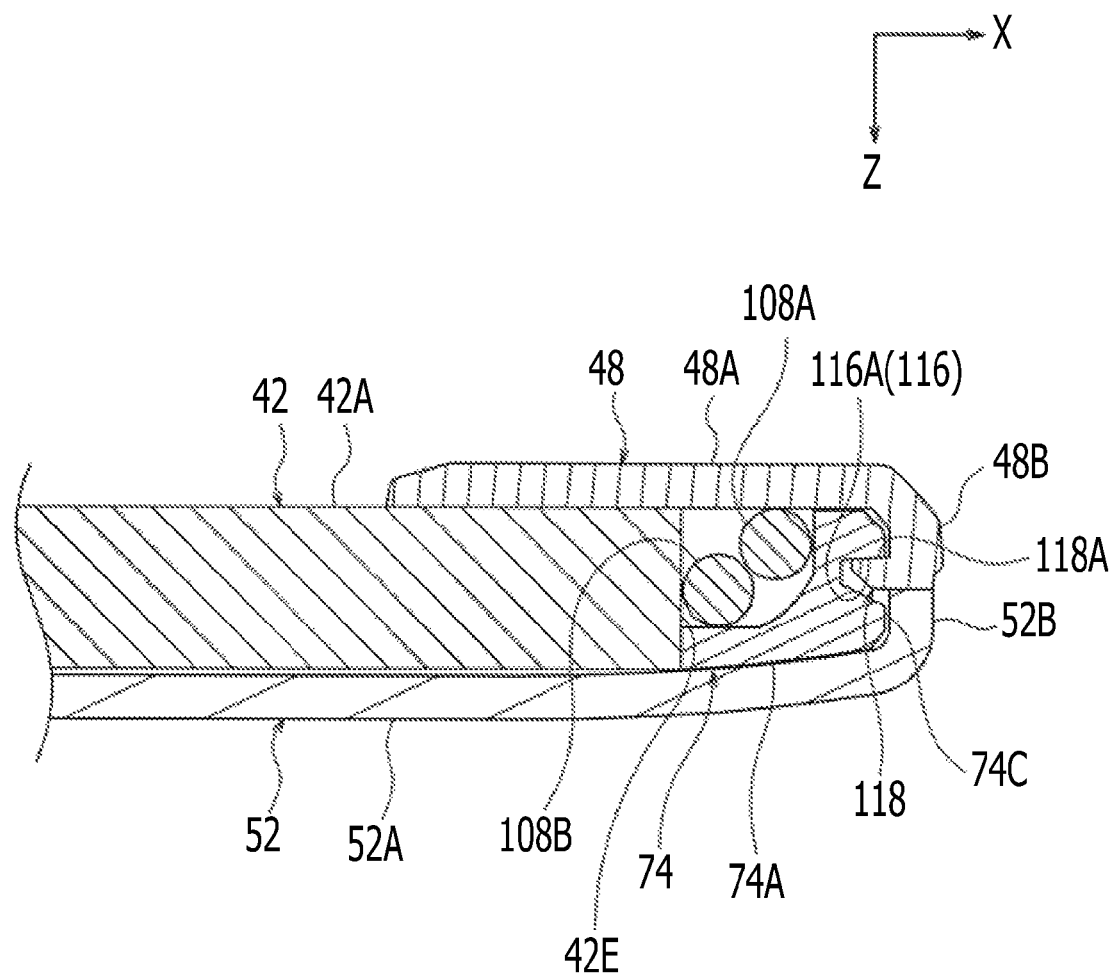
FIG. 9 illustrates an exemplary cross-sectional view of a display unit.

The claws 118 are provide at the ends of the front cover 48 in the widthwise direction. The claws 118 protrude from the ends of the side wall 48B of the front cover 48 adjacent to the back cover 52 to the center of the front cover 48 in the widthwise direction. The surface of the claws 118 adjacent to the front cover 48 may correspond to the retaining surfaces 118A parallel to the front wall 48A of the front cover 48. FIG. 9 illustrates an exemplary cross-sectional view of a display unit. The cross-sectional view illustrated in FIG. 9 may be a cross-sectional view along the widthwise direction of the display unit 40 in FIG. 1 in which the front cover 48 is mounted to the side frame 72. As illustrated in FIG. 9, the retaining surface 118A of each claw 118 is retained to the retained surface 116A of the groove 116 of the side-frame main body 74. This allows the front cover 48 to be mounted to the side-frame main body 74.

Figure 11A:
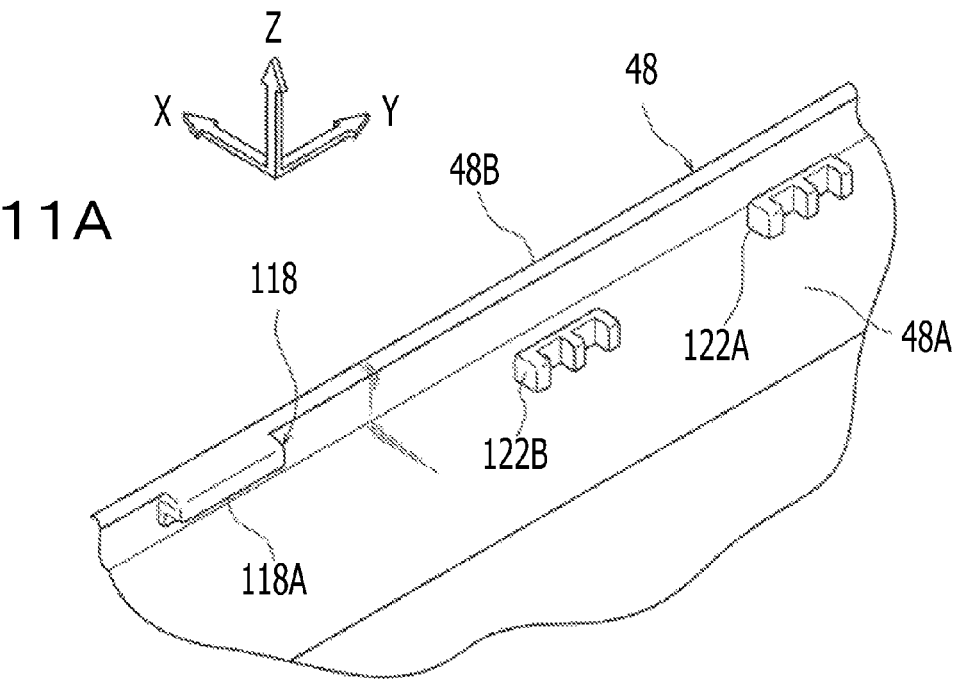
FIGS. 11A and 11B illustrate an exemplary claw and an exemplary rib.
Figure 11B:
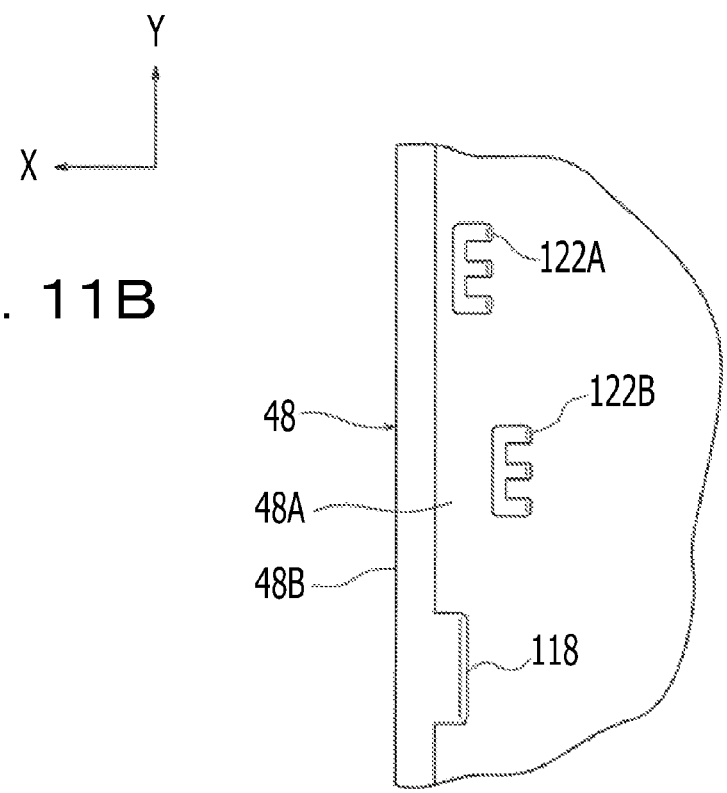
Figure 12:
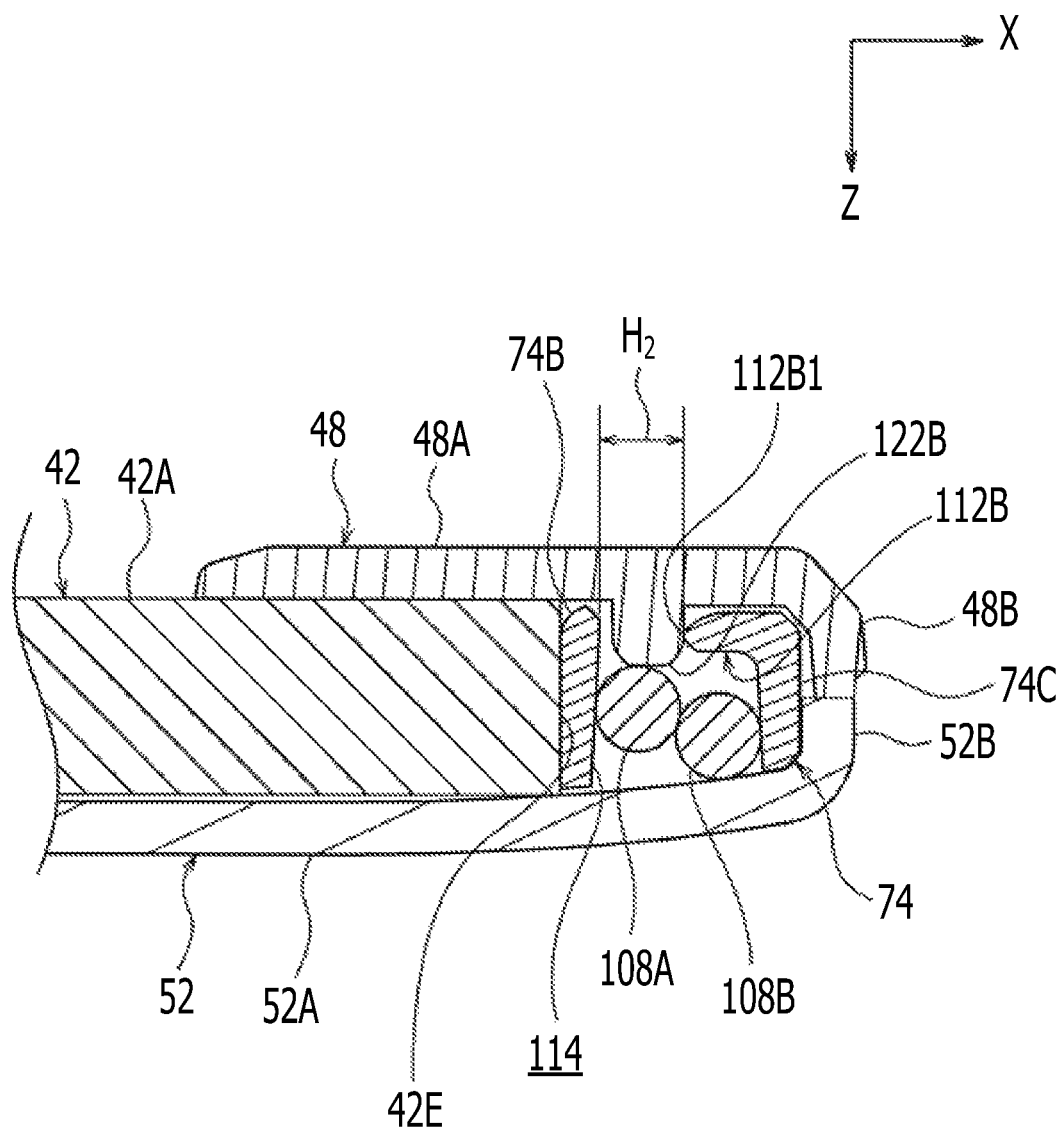
FIG. 12 illustrates an exemplary cross-sectional view of a display unit.

FIG. 10 illustrates an exemplary perspective view of a front cover. The perspective view illustrated in FIG. 10 may correspond to a perspective view of the front cover 48 in FIG. 1, as viewed from diagonally behind in the front-to-back direction. As illustrated in FIG. 10, the front wall 48A of the front cover 48 is provided with the plurality of ribs 122A and 122B. FIGS. 11A and 11B illustrate exemplary claw and rib. FIG. 11A illustrates a perspective view of the front cover 48. FIG. 11A may be an enlarged perspective view of the perspective view illustrated in FIG. 10. FIG. 11B illustrates a plan view of the front cover 48. The plan view illustrated in FIG. 11B may be a plan view of the front cover 48 having the claws 118 and the ribs 122A and 122B as viewed from the back in the front-to-back direction. As illustrated in FIG. 11A, the ribs 122A and 122B are formed in E-shape as viewed from the front-to-back direction of the display unit 40 and are disposed adjacent to the side wall 48B of the front cover 48. As illustrated in FIG. 11B, the ribs 122A and 122B extend in the vertical direction of the front cover 48 and are disposed at different positions in the widthwise direction of the front cover 48, depending on the gaps $H_1$ and $H_2$ formed in the side-frame main body 74. FIG. 12 illustrates an exemplary cross-sectional view of a display unit. The cross-sectional view illustrated in FIG. 12 may be a cross-sectional view of the display unit 40 illustrated in FIG. 1 taken along the widthwise direction in which the front cover 48 is mounted on the side frame 72. When the retaining surfaces 118A of the claws 118 of the front cover 48 are retained to the retained surfaces 116A of the grooves 116 of the side-frame main body 74, the ribs 122B are fitted in the gap $H_2$ of the side-frame main body 74, as illustrated in FIG. 12.

Since the back cover 52 is formed of a pressed plate, the display unit 40 may be reduced in thickness and weight.

Forming the back cover 52 out of a thin pressed plate may reduce the rigidity of the back cover 52 and increase the bending deformation or the like of the display panel 42 caused by the opening and closing operation of the display unit 40.

As illustrated in FIG. 5, the side frames 72 are disposed at the individual sides 46C of the casing 46 of the display unit 40 illustrated in FIG. 1. The side-frame main bodies 74 of the side frames 72 are disposed along the ends of the back cover 52 in the widthwise direction and are bonded to the back wall 52A of the back cover 52 across the entire length in the longitudinal direction. The side-frame main bodies 74 may ensure the rigidity of the sides 46C of the casing 46. Forming the back cover 52 out of a thin pressed plate may reduce the bending deformation or the like of the display panel 42 with respect to the main body unit 20 in FIG. 1, which is caused by the opening and closing operation of the display unit 40. This also reduces the thickness of the display unit 40 while reducing the bending deformation or the like of the display panel 42 caused by the opening and closing operation of the display unit 40.

The upper positioning portion 76 is provided at the upper end of each side frame 72. The upper positioning portions 76 are overlaid on the ends in the longitudinal direction of the antenna cover 62 mounted at the upper end of the back cover 52 and are joined to the antenna cover 62 by welding. For example, the pair of side frames 72 are joined by the antenna cover 62. Therefore, this may increase the rigidity of the sides 46C of the casing 46 as compared with a structure in which the pair of side frames 72 are not joined by the antenna cover 62. Since the antenna cover 62 is mounted to the upper end of the back cover 52, the rigidity of the upper part 46A of the casing 46, illustrated in FIG. 1, may be ensured. This may reduce the bending deformation or the like of the display panel 42 caused by the opening and closing operation of the display unit 40.

The lower part 46B of the casing 46 in FIG. 1 is provided with the lower frame 70. The lower-frame main body 70A of the lower frame 70 is disposed along the lower end of the back cover 52 and is boned to the back wall 52A of the back cover 52 across the entire length in the longitudinal direction. Therefore, this may ensure the rigidity of the lower part 46B of the casing 46.

The extending portions 70B extending toward the antenna cover 62 are provided at both ends of the lower-frame main body 70A in the longitudinal direction. The extending portions 70B are disposed adjacent to the lower positioning portions 78 of the side frames 72. This may increase the rigidity of the sides 46C of the casing 46 as compared with a case where the extending portions 70B are not adjacent to the lower positioning portions 78 of the side frames 72. Therefore, this may reduce the bending deformation of the display panel 42 caused by the opening and closing operation of the display unit 40.

The press working may not be suitable for fine work. Therefor, forming the back cover 52 out of a pressed plate may make it difficult to form ribs or the like on the back cover 52 for positioning the display panel 42 to the back cover 52.

The side-frame main bodies 74 are disposed along the individual side surfaces of the display panel 42. The first contact surfaces 74S1 that come into surface contact with the individual side surfaces 42E1 of the upper corners 42K1 of the display panel 42 are formed at the upper parts of the individual side-frame main bodies 74. The first contact surfaces 74S2 that come into contact with the individual side surfaces 42E2 of the lower corners 42K2 of the display panel 42 are formed at the lower parts of the side-frame main bodies 74. Since the first contact surfaces 74S1 and 74S2 hold the upper corners 42K1 and the lower corners 42K2 of the display panel 42 from both ends in the widthwise direction, the widthwise displacement of the display panel 42 with respect to the back cover 52 may be restricted.

The upper positioning portions 76 extending along the upper surface 42C of the display panel 42 are provided at the upper ends of the individual side frames 72. The upper positioning portions 76 each have the second contact surface 76S that comes into surface contact with the upper surface 42C1 of the upper corner 42K1 of the display panel 42. The lower positioning portions 78 extending along the lower surface 42D of the display panel 42 are provided at the lower ends of the individual side frames 72. The lower positioning portions 78 each have the third contact surface 78S that comes into surface contact with the lower surface 42D1 of the lower corner 42K2 of the display panel 42. Since the second contact surfaces 76S and the third contact surfaces 78S retain the display panel 42 from both ends in the vertical direction, the vertical displacement of the display panel 42 with respect to the back cover 52 may be restricted.

Forming the first contact surfaces 74S1 and 74S2, the second contact surfaces 76S, and the third contact surfaces 78S at the side frames 72 corresponding to the side 46C of the casing 46 may reduce the displacement of the display panel 42 with respect to the back cover 52. Since the first contact surfaces 74S1 and 74S2 and so on restrict the displacement of the upper corners 42K1 and the lower corners 42K2 of the display panel 42, the displacement of the display panel 42 may be reduced as compared with a case where displacement of parts of the display panel 42 other than the corners 42K is restricted.

The press working may not be suitable for forming a complicated shape. Therefore, if the back cover 52 is formed of a pressed plate, it may be difficult to hold the antenna cables 108A and 108B and so on with the back cover 52 or to form a clamp or guide on the back cover 52. Fixing the antenna cables 108A and 108B and so on to the back cover 52 with a tape or the like may complicate the work of assembling the display unit 40, thus reducing the production efficiency of the display unit 40.

As illustrated in FIG. 7, since the side-frame main body 74 is provided with the guide path 110 for guiding the antenna cables 108A and 108B and so on, the assembly efficiency of the display unit 40 may be improved.

Since the antenna cables 108A and 108B and so on are accommodated in the guide path 110, the antenna cables 108A and 108B and so on are wired along the side surfaces 42E of the display panel 42. This may reduce the thickness of the display unit 40 as compared with a case where the antenna cables 108A and 108B and so on are wired between the back surface 42B of the display panel 42 and the back cover 52, illustrated in FIG. 2.

The side walls 74B and 74C of the side-frame main bodies 74 are provided with the protruding portions 112A and 112B that protrude to the guide path 110 and that are disposed at the front cover 48 side with respect to the antenna cables 108A and 108B accommodated in the guide path 110. The protruding portions 112A and 112B reduce the dropping-off of the antenna cables 108A and 108B and so on from the guide path 110.

Since the press working is not suitable for forming a complicated form, it may be difficult to form grooves 116 for retaining the claws 118 of the front cover 48 to the back cover 52. It may also be difficult to form screw holes or the like for fixing the display panel 42 to the back cover 52 formed of a pressed plate with screws or the like.

As illustrated in FIG. 9, the grooves 116 are formed in the outer side surface 74C1 of the side wall 74C of the side-frame main body 74. Since the retaining surfaces 118A of the claws 118 formed at the front cover 48 are retained to the retained surfaces 116A of the grooves 116, the front cover 48 is fixed to the side-frame main body 74. Since the retaining surfaces 118A of the claws 118 of the front cover 48 are retained to the retained surfaces 116A of the grooves 116, the back cover 52 and the front cover 48 are joined together via the side frames 72. Since the back cover 52 and the front cover 48 hold the display panel 42 from both sides in the front-to-back direction, the front-to-back displacement of the display panel 42 with respect to the back cover 52 may be restricted.

When the retaining surfaces 118A of the claws 118 of the front cover 48 are retained to the retained surfaces 116A of the grooves 116, the ribs 122B formed on the front cover 48 are fitted in the gap $H_2$ between the distal ends 112B1 of the protruding portions 112B protruding from the side wall 74C of the side-frame main body 74 and the side wall 74B of the side-frame main body 74, as illustrated in FIG. 12. This may reduce the widthwise displacement of the front cover 48 with respect to the side-frame main body 74. If the front cover 48 is bent and deformed or the like, the ribs 122B come into contact with the distal ends 112B1 of the protruding portions 112B or the side wall 74B of the side-frame main body 74. This may reduce the bending deformation or the like of the end of the front cover 48 in the widthwise direction and the lifting-off of the end of the front cover 48 in the widthwise direction from the side-frame main body 74. This may reduce the coming-off of the retaining surfaces 118A of the claws 118 of the front cover 48 from the retained surfaces 116A of the grooves 116 of the side-frame main body 74. This may also reduce the coming-off of the front cover 48 from the side-frame main body 74.

Although not illustrated, when the retaining surfaces 118A of the claws 118 of the front cover 48 are retained to the retained surfaces 116A of the grooves 116, for example, the protruding portions 112A formed at the front cover 48 are fitted in the gap $H_1$ formed between the distal ends 112A1 of the protruding portions 112A protruding from the side wall 74B of the side-frame main body 74 and the side wall 74C of the side-frame main body 74, illustrated in FIG. 8. This may reduce the coming-off of the front cover 48 from the side-frame main body 74.

The side frames 72 are each provided with the first contact surfaces 74S1 and 74S2, the second contact surface 76S, and the third contact surface 78S that locate the display panel 42 with respect to the back cover 52. The side frames 72 are each provided with the guide path 110 that guides the antenna cables 108A and 108B and so on. The side frames 72 are each provided with the grooves 116 for fixing the front cover 48. Since various functions are provided centrally to the side frames 72 corresponding to the frame of the sides 46C of the casing 46, the number of components may be reduced, and thus the assembly efficiency of the display unit 40 may be improved.

The first contact surface 74S1 may be formed at the upper part of the side-frame main body 74, and the first contact surface 74S2 may be formed at the lower part of the side-frame main body 74. The first contact surfaces 74S1 and 74S2 may adjust the widthwise displacement of the display panel 42 from the back cover 52. For example, the first contact surface 74S1 may be formed at an intermediate portion of the side-frame main body 74 in the longitudinal direction. For example, the first contact surface 74S1 may be formed across the entire length of the side-frame main body 74 in the longitudinal direction.

The first contact surfaces 74S1 and 74S2 may be formed on the side-frame main body 74. Instead of the first contact surfaces 74S1 and 74S2, ribs or the like that come into contact with the side surfaces 42E of the display panel 42 may be provided. This applies also to the upper positioning portion 76 and the lower positioning portion 78.

The entire length of the side-frame main body 74 in the longitudinal direction may be bonded to the back wall 52A of the back cover 52. The bonding range of the side-frame main body 74 to the back wall 52A of the back cover 52 may be changed. For example, the back cover 52 may be fixed to the side frames 72 with screws or the like.

The upper positioning portions 76 of the pair of side frames 72 may be joined together by the antenna cover 62. The pair of side frames 72 may be either joined or not joined by the antenna cover 62 or the like as appropriate.

The antenna cable 108A and so on are accommodated in the guide path 110 of the side-frame main body 74. For example, a cable extending from a microphone, a speaker, or an infrared communication device accommodated in the display unit 40 to the main body unit 20 may be accommodated in the guide path 110. The guide path 110 and the protruding portions 112A and 112B formed at the side-frame main bodies 74 may be omitted. The guide path 110 may be omitted in a notebook computer that does not include a built-in component, such as the camera unit 100.

The mounting of the front cover 48 to the side frames 72 may be achieved by engaging the claws 118 formed on the front cover 48 with the retained surfaces 116A of the grooves 116 formed in the side-frame main bodies 74. For example, the front cover 48 may be mounted to the side frames 72 with screws. The ribs 122A and 122B formed on the front cover 48 may be omitted.

The antenna cover 62, the side frames 72, and the lower frame 70 may be formed of plastic molds or metal molds.

The back cover 52 may be formed of a pressed plate, a metal plate that is not pressed, or a plastic or metal mold.

Examples of the electronic apparatus may include a notebook computer, a mobile phone, a portable DVD player, and an electronic dictionary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display unit comprising:
 a display panel;
 a pair of side frames extending along side surfaces of the display panel respectively;
 a back cover that is mounted to the side frames and covers a back surface of the display panel;
 a front cover that is mounted to the pair of side frames, covers a periphery of a front surface of the display panel and holds an outer periphery of the display panel with the back cover;
 an upper positioning portion that is formed at an upper end of each of the pair of side frames and extends along an upper surface of the display panel; and
 a lower positioning portion that is formed at a lower end of each of the pair of side frames and extends along a lower surface of the display panel,
 wherein:
  a first side frame of the pair of side frames includes:
   a guide path formed along the first side frame and that includes a first side wall and second side wall that face each other;
   a coupling portion formed on a side of the back cover and coupling the first side wall and second side wall; and
   a protruding portion formed at the first side frame that protrudes from the first side wall to the second side wall;
  an opening portion is formed on a side of the front cover and is facing the coupling portion; and
  the front cover has a rib fitted in a gap between the protruding portion and the second side wall.

2. The display unit according to claim 1, wherein the back cover is formed of a press-molded metal plate.

3. The display unit according to claim 1, wherein the pair of side frames are bonded to the back cover along ends of the back cover in the widthwise direction.

4. The display unit according to claim 1, wherein a first contact surface is formed at the pair of side frames, the first contact surface being in contact with a side surface of a corner of the display panel.

5. The display unit according to claim 4, wherein the first contact surface restricts a widthwise displacement of the display panel.

6. The display unit according to claim 1, wherein:
a second contact surface is formed at the upper positioning portion, the second contact surface being in contact with an upper surface of a corner of the display panel and
a third contact surface is formed at the lower positioning portion, the third contact surface being in contact with a lower surface of a corner of the display panel.

7. The display unit according to claim 6, wherein the third contact surface restricts a vertical displacement of the display panel between the third contact surface and the second contact surface.

8. The display unit according to claim 1, further comprising an upper frame that is disposed along the upper end of the back cover and that joins the upper positioning portions together.

9. The display unit according to claim 1, wherein:
the guide path of the first side frame is formed such that the first side frame has an open cross-sectional shape that is open to the front cover; and
the guide path guides a cable along the side surface of the display panel.

10. The display unit according to claim 1, wherein the protruding portion is protruding to the guide path and disposed closer to the front cover than the cable accommodated in the guide path.

11. The display unit according to claim 1, wherein a claw whose distal end is oriented to the center of the front cover in the widthwise direction is formed at each end of the front cover in the widthwise direction.

12. The display unit according to claim 11, wherein a groove is formed at the outer side surfaces of the side frames opposite to the display panel, the groove being engaged by the claw.

13. An electronic apparatus comprising:
a display unit including
a display panel,
a pair of side frames extending along side surfaces of the display panel respectively;
a back cover that is mounted to the side frames and covers a back surface of the display panel;
a front cover that is mounted to the pair of side frames, covers a periphery of a front surface of the display panel and holds an outer periphery of the display panel with the back cover;
an upper positioning portion that is formed at an upper end of each of the pair of side frames and extends along an upper surface of the display panel;
a lower positioning portion that is formed at a lower end of each of the pair of side frames and extends along a lower surface of the display panel; and
a main body unit that openably supports the display unit, wherein:
a first side frame of the pair of side frames includes:
a guide path formed along the first side frame and that includes a first side wall and second side wall that face each other;
a coupling portion formed on a side of the back cover and coupling the first side wall and second side wall; and
a protruding portion formed at the first side frame that protrudes from the first side wall to the second side wall;
an opening portion is formed on a side of the front cover and is facing the coupling portion; and
the front cover has a rib fitted in a gap between the protruding portion and the second side wall.

14. The display unit according to claim 1, wherein the back cover includes a back wall facing the back surface of the display panel and a third side wall covering a part of the one of the pair of side frames.

15. The display unit according to claim 14, wherein the third side wall covers the coupling portion and a part of the first side wall.

16. The display unit according to claim 1, wherein the second side wall is contact with a side surface of the display panel.

17. The electronic apparatus according to claim 13, wherein the back cover includes a back wall facing the back surface of the display panel and a third side wall covering a part of the one of the pair of side frames.

18. The electronic apparatus according to claim 17, wherein the third side wall covers the coupling portion and a part of the first side wall.

19. The electronic apparatus according to claim 13, wherein the second side wall is contact with a side surface of the display panel.

* * * * *